Oct. 20, 1942.   S. VALUCH   2,299,365
METER CHANGING WATER CUTOFF
Filed May 28, 1941   2 Sheets-Sheet 1
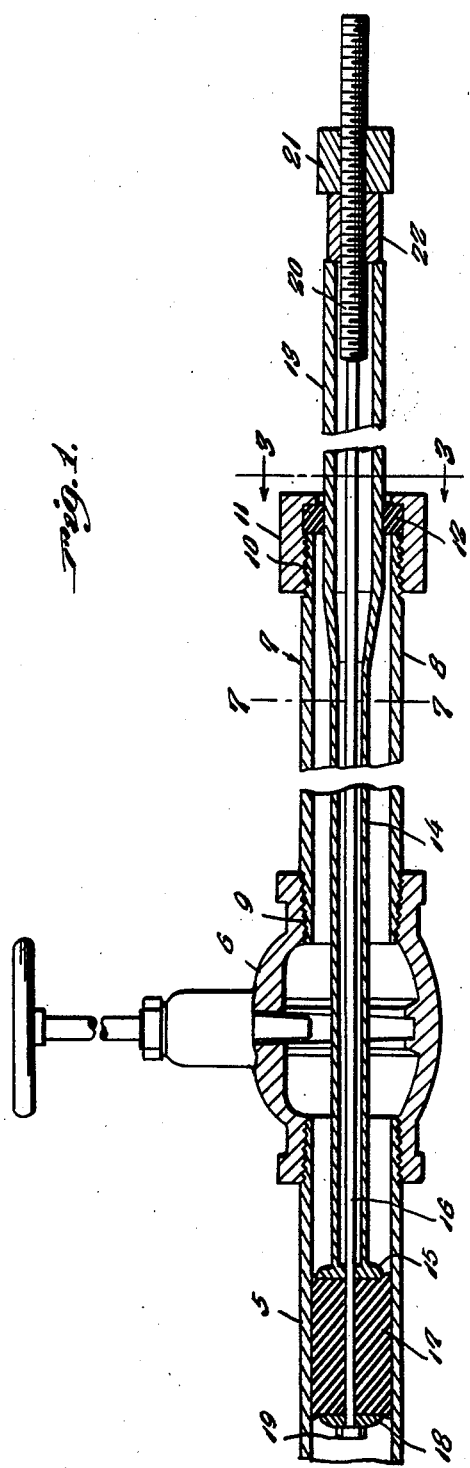
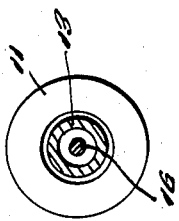
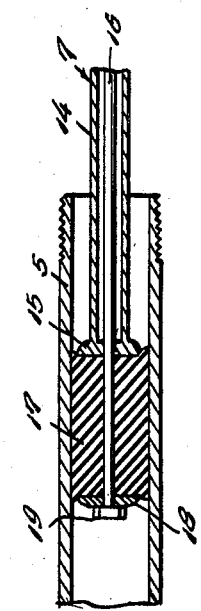
Inventor
Samuel Valuch
By *Clarence A. O'Brien*
Attorney Oct. 20, 1942.  S. VALUCH  2,299,365
METER CHANGING WATER CUTOFF
Filed May 28, 1941  2 Sheets-Sheet 2
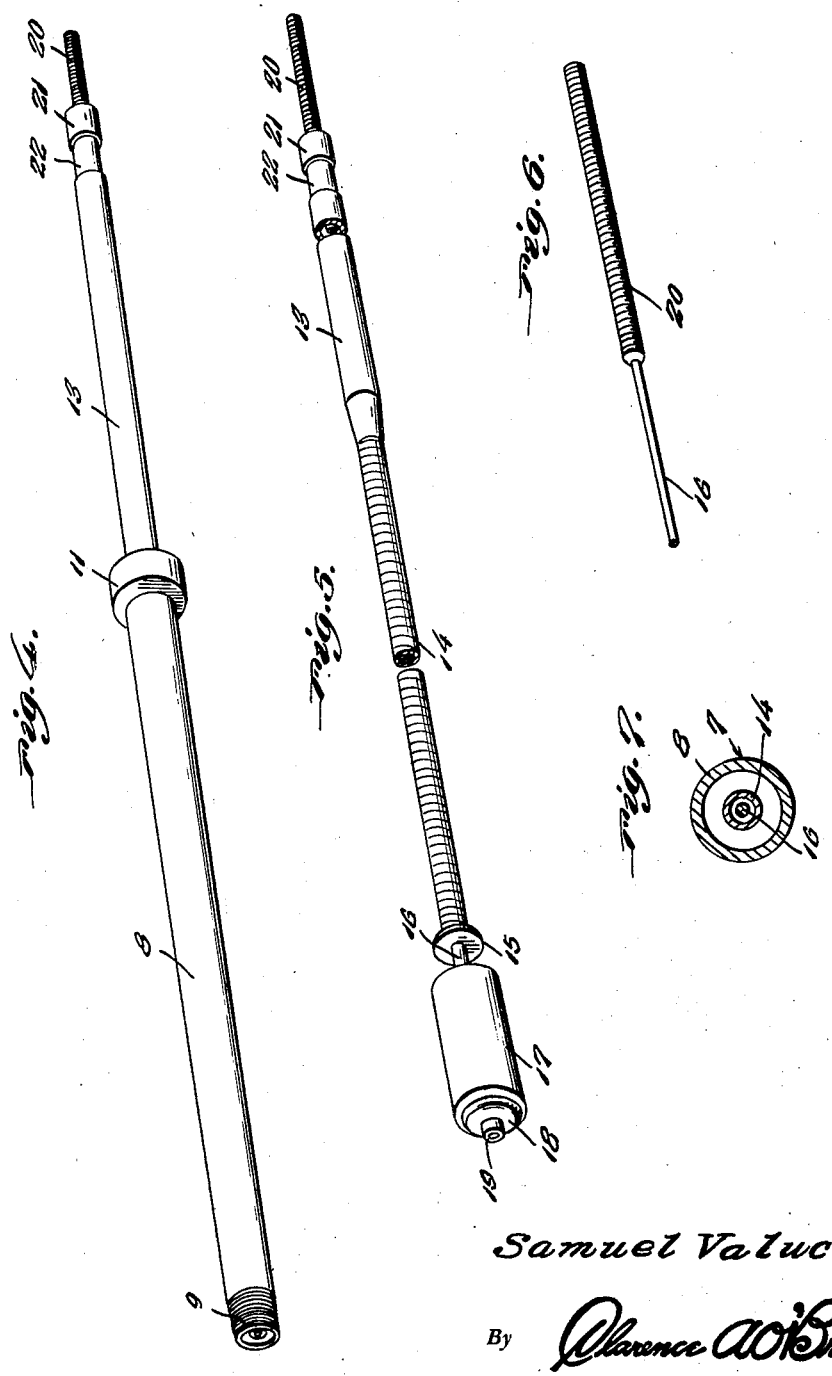
Inventor
Samuel Valuch
By Clarence A O'Brien
Attorney

UNITED STATES PATENT OFFICE 2,299,365

METER CHANGING WATER CUTOFF

Samuel Valuch, Cudahy, Wis.

Application May 28, 1941, Serial No. 395,662

1 Claim. (Cl. 29—84)

This invention relates to new and useful improvement in means whereby water meter valves can be removed and replaced in instances where water cannot be cut off at the street entrance due perhaps to ice and snow covering the usual stop box, or for other reasons.

The principal object of the present invention is to provide a water cut-off device which can be used immediately at the meter valve to shut off the water while the valve is being removed and replaced.

Another important object of the invention is to provide a device of the character stated which is of simple construction and easy to manipulate.

These and various other important objects and advantages of the invention will become apparent to the reader of the following specification.

In the drawings—

Figure 1 represents a longitudinal sectional view through a meter valve and the improved appliance making up the present invention.

Figure 2 is a fragmentary longitudinal sectional view of the appliance after the valve has been removed.

Figure 3 is a section on the line 3—3 of Figure 1.

Figure 4 is a perspective view of the device alone.

Figure 5 is a fragmentary perspective view of the device after the barrel and packing gland has been removed.

Figure 6 is a fragmentary perspective view of the screw and compressing rod.

Figure 7 is a section on the line 7—7 of Figure 1.

Referring to the drawings wherein like numerals designate like parts, it can be seen that numeral 5 denotes a water meter pipe having a meter valve 6 at the end thereof.

Numeral 7 generally refers to the present invention which consists of an elongated barrel 8 having a tapered and threaded end 9 for threaded disposition into the valve 6 to be removed.

The other end of the barrel 8 is threaded as at 10 for threaded disposition into a packing gland cap 11 in which is a gland element 12. Feedable through the gland element 12 is a tube 13 which is suitably secured as by welding to an elongated flexible tube 14 of less cross sectional dimension. The flexible tube 14 terminates in a head 15 having an opening therein through which a flexible rod 16 is slidable. Beyond the head 15 is a compressible packing body 17 preferably of rubber through which the end portions of the flexible rod 16 extends. This rod extends through a cap plate 18 bearing against the body 17 and is equipped with a nut 19 bearing against the cap plate 18.

The other end of the rod 16, and it may be noted that the rod tapers longitudinally, is secured to an elongated threaded member 20 which partly projects into the open end of the large tube 13. On this threaded member 20 is a nut 21 and interposed between the nut 21 and the adjacent end of the tube 13 is a sleeve 22.

In the use of this appliance, the meter is first shut off at the valve 6. The meter coupling is then removed, freeing one side of the valve so that the threaded end 9 of the barrel 8 can be inserted. The packing gland 11, 12 is now tightened. The valve 6 is now opened and the tube 13 forced inwardly so that the body 17 is passed through the valve 6 and into the pipe 5. The nut 21 is now rotated so as to pull on the flexible rod 16, thus expanding the body 17, to the end that no further water can reach the valve 6. The packing gland 11, 12 can now be loosened so that the same can slide on the tube 13 and then the barrel 8 can be unscrewed from the valve 6. The barrel 8 and packing gland 11, 12, can be slid over the sleeve 22 and nut 21. The valve 6 may now be removed from the pipe 5 and also slid over the sleeve 22 and nut 21 and a new valve replaced by sliding over the remaining portions of the appliance in the opposite direction and attached to the pipe 5.

The barrel 8 is now replaced over the tube 13 and screwed into the valve 6, the packing gland 11, 12 tightened, the rod 16 loosened to permit contraction of the body 17 after which the body 17 is withdrawn through the new valve 6 into the barrel 8, after which the valve 6 can be closed and the appliance removed.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

Apparatus for stopping a pipe line extending from one side of a valve comprising a threaded barrel for attachment at one end to the other side of the valve and having a packing gland on the other end thereof, a tube for insertion through said gland, barrel and valve to position one end thereof in said line and having an enlarged disk-like head on said end, an endwise adjustable rod extending through said tube and slidable in said head, said rod having a cap plate fast thereon, an expansible resilient plug interposed on said rod between said head and plate for compression between the head and plate under adjustment of said rod to thereby clamp the plug against said pipe, and manipulative means on said rod at the other end thereof for adjusting said rod, said tube having a reduced front end portion for insertion through said gland with a clearance to facilitate positioning the front end thereof together with said plug in the line, a larger rear end portion for fitting in said gland to form therewith a seal, and a rearwardly flared portion intermediate said reduced and larger portions for facilitating insertion of the larger portion through the gland.

SAMUEL VALUCH.